Jan. 17, 1950
G H. BERKHOLDER
2,495,087
CONTROL DEVICE
Filed Nov. 22, 1943
2 Sheets-Sheet 1
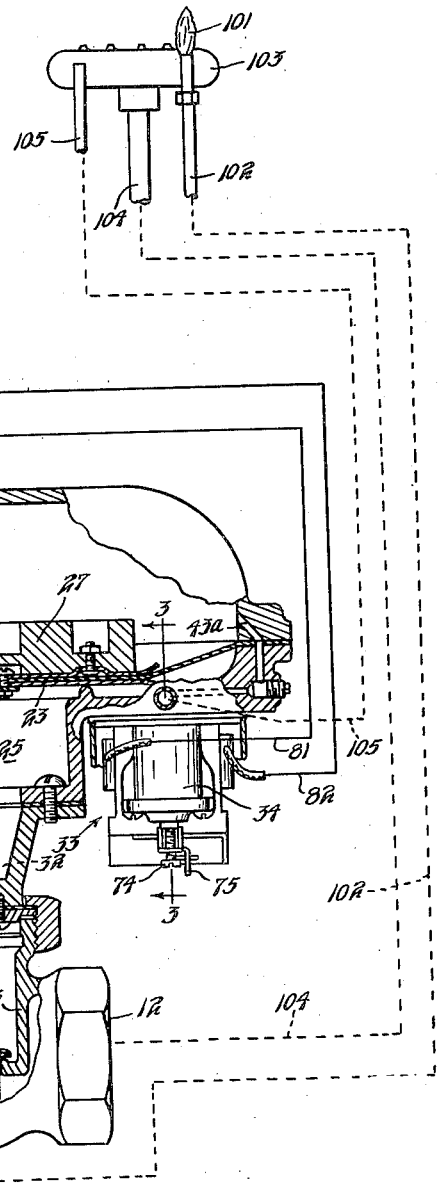
Fig. 1.
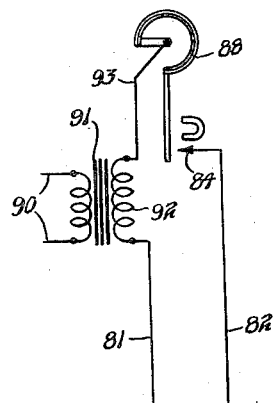
Inventor
GEORGE H. BERKHOLDER
By
George H. Fisher
Attorney Jan. 17, 1950         G. H. BERKHOLDER        2,495,087
CONTROL DEVICE
Filed Nov. 22, 1943                           2 Sheets-Sheet 2
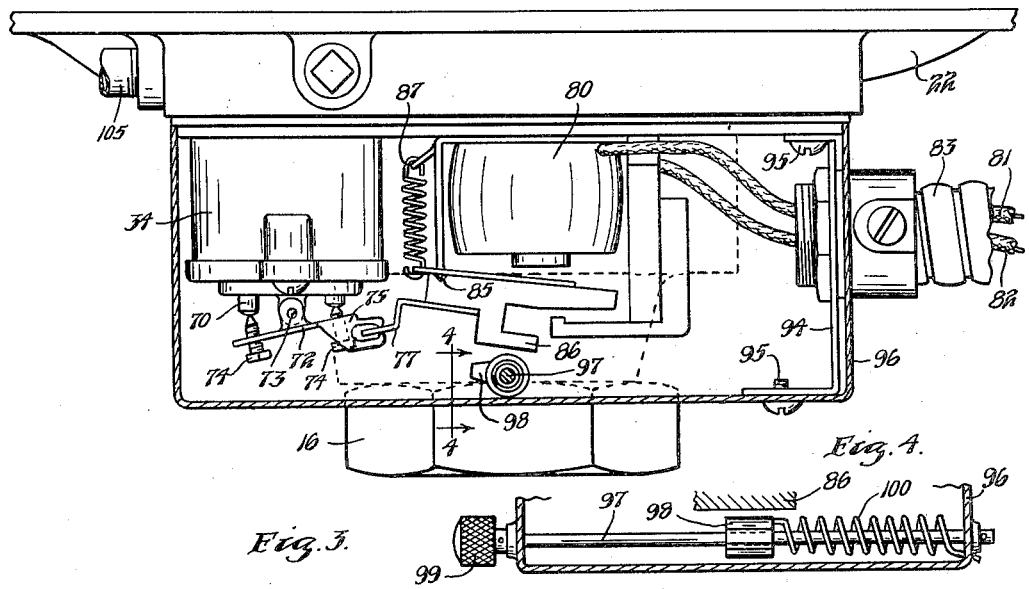
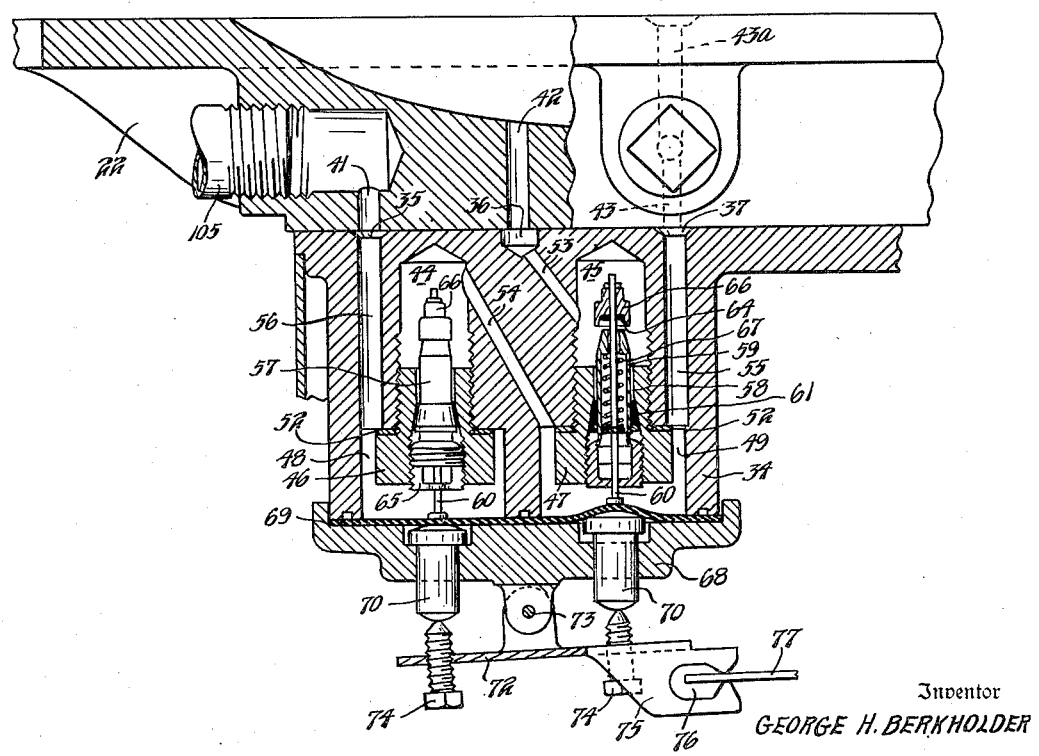
Inventor
GEORGE H. BERKHOLDER
By
George H. Fisher
Attorney Patented Jan. 17, 1950

2,495,087

UNITED STATES PATENT OFFICE 2,495,087

CONTROL DEVICE

George H. Berkholder, Minneapolis, Minn., assignor to Minneapolis-Honeywell Regulator Company, Minneapolis, Minn., a corporation of Delaware Application November 22, 1943, Serial No. 511,285

6 Claims. (Cl. 121—46.5)

This invention relates to improvements in a control device adapted to be used in the control of the flow of fluid, such as gas or the like through an automatically controlled pressure operated valve. However employment of the improved device of this invention may be extended to other and different fields.

It is not new in the art to control the pressure on a diaphragm valve or other pressure responsive devices by means of an electromagnetically operated pilot valve mechanism. Many of the prior constructions employed a ball, disc or other type valve which usually requires very close tolerance machine or handwork to insure proper seating and functioning of the finished device. Then too it is quite often necessary to disassemble substantially the entire device for replacement, adjustment or repair of the close fitting parts. The close work in production and the extensive labor and time required in maintenance tend toward excessive initial and operating cost.

Accordingly it is one of the principal objects of this invention to overcome the foregoing objections by the provision of means for economically producing an efficient and simple electromagnetically operated pilot valve mechanism which may be employed to uniformly control the operation of a pressure responsive device such as a diaphragm valve or the like.

Another object of advantage and importance of the improved device of this invention resides in the provision of means whereby individual valve units for the device may be produced, assembled and tested prior to their installation in the improved device. Furthermore installation or removal of the valve units may be quickly and easily made by unskilled persons without the aid of special tools or equipment.

A further object of importance and advantage is the provision of means for arranging the passageways so that upon the installation of a pair of valve units therein, inlet pressure assists in sealing one valve and outlet pressure assists in sealing the other valve. Both valves are thus positioned to seat in the direction of the flow controlled thereby.

Still another important object of advantage of the improved device of this invention resides in the provision of means for limiting strain and reducing wear on the movable valve member by directing the passing fluid against the substantially concave sealing surface of the valve member thereby causing an abrupt change in the direction of flow which is utilized in assisting to hold the valve in open position against opposing pressure exerted on the opposite stepped surface. Another and still further object of advantage and importance of the improved device is the provision of means for mounting the entire pilot valve structure as a compact unit which may be attached to new or used main valve members.

An additional object of importance and advantage resides in the provision of means for manually operating the device in the event of power failure and upon the resumption of power to automatically move the manual operating means into a nonactivating position.

Additional objects of importance and advantage, some of which are hereinafter specifically set forth, will become apparent as the following detailed description progresses, reference being had to the accompanying drawing wherein Figure 1 is an elevational view of a diaphragm valve and control assembly, which embodies the invention, diagrammatically associated with the room thermostat and a burner. Portions of the valve and control assembly are broken away to more clearly show the underlying structure.

Figure 2 is a slightly enlarged end view of the structure shown in Figure 1, portions thereof being broken away, Figure 3 is a further enlarged sectional view of the pilot valve taken on the line 3—3 of Fig. 1, and Figure 4 is a vertical section showing the manual operator taken on the line 4—4 of Figure 2 looking in the direction indicated by the arrows.

The reference numeral 10 indicates generally a valve having an inlet 11 and an outlet 12. Formed in the interior of the valve 10 intermediate the inlet 11 and the outlet 12 is an apertured dividing wall 13. Operably positioned within the valve 10 and adapted to cooperate with the edges of the aperture in the wall 13 to permit or prevent the passage of fluid therethrough is a valve member 14.

Positioned on the valve 10 and extending upwardly thereabove is a supporting bracket 15. The bracket 15 may be secured to the valve 10 by any suitable means, as for instance by a securing nut 16. Positioned on the supporting bracket 15 and secured thereto by screws is a pressure motor 20. The pressure motor 20 comprises an upper member 21 and a lower member 22 each of which are substantially concavo-convex in section. Clamped between the upper and lower members of the pressure motor 20 is a flexible diaphragm 23 upon which a counterweight 27 may be positioned. The diaphragm and the upper and lower members of the pressure motor 20 are secured together by a plurality of screws 24a. The diaphragm 23 divides the interior portion of the motor 20 into an upper pressure chamber 24 and a lower pressure chamber 25.

Secured to the valve member 14 and projecting upwardly through the valve body 10, the securing nut 16, the supporting bracket 15, and into the lower pressure chamber 25 is a valve stem 26. The upper end of the valve stem 26 is operably associated with the diaphragm 23 as is best shown in Figure 1.

Formed in the valve stem 26 and extending longitudinally thereof is a passageway 30. When the valve is in closed position the passageway 30 extends from a point within the valve body 10 to a point within the lower chamber 25 as is clearly shown in the drawing. Secured to the lower portion of the supporting bracket 15 and having the valve stem 26 slidable therethrough is an adjustable sleeve member 31. The passageway 30 and the adjustable member 31 cooperate to govern the flow of fluid from the valve body 10 into the lower chamber 25 thus controlling movement of the diaphragm 23 and also the movement of the valve member 14. An auxiliary passageway 32 extending from the interior of the valve body 10 into the interior of the supporting bracket 15 provides a means for passing a limited supply of fluid into the lower chamber 25.

A pilot valve assembly indicated generally by the reference numeral 33 is secured to the lower member 22 as is best shown in Figure 1. The pilot valve assembly 33 comprises a valve housing 34 which is provided with three openings which are indicated by the reference numerals 35, 36 and 37 as is best shown in Figure 3. The openings 35, 36 and 37 which extend through the base of the valve housing 34 are in registry with passageways 41, 42 and 43, respectively in the lower member 22 of the pressure motor 20. The valve housing 34 is recessed, as is best shown in Figure 3, to provide chambers 44 and 45 which are adapted to receive inserts 46 and 47. The inserts 46 and 47 which screw threadedly engage the valve housing 34 are preferably provided with hexagon or other tool receiving heads to facilitate their insertion and removal.

A portion of the recesses 44 and 45 are concentrically counterbored as indicated by the reference numerals 48 and 49, respectively, to provide ample room for the head portion of the inserts 46 and 47 together with a tool which may be positioned thereon. Suitable gaskets as shown at 52 in Figure 3 may be employed to provide a fluid tight joint between the inserts 46 and 47 and the valve housing 34. A passage 53 extends diagonally from the opening 36 into the recess 45 as is best shown in Figure 3. The recess 44 is connected to the counterbore portion 49 of the recess 45 by means of an angularly disposed passage 54. The passage 53 provides an inlet to the recess 45 and the passage 54 provides an outlet from the counterbore 49. A passage 55 connects the opening 37 with the counterbore 49 and a passage 56 connects the opening 35 with the counterbore 48.

Screw threadedly secured to the inserts 46 and 47 are valve members 57 and 58, respectively. The valve members 57 and 58 are identical. However in the positions shown in Figure 3 the valve member 57 functions as an outlet valve and the valve member 58 functions as an inlet valve. Each valve comprises a substantially tubular casing 59 in which a valve stem 60 is operably positioned. One end of the casing 59 is formed to provide a valve seat 64 and the opposite end is formed as at 65 to receive a positioning tool. The formed end 65 of the casing facilitates assembly of the valve member with its associated insert member. A sealing member 61 interposed between the exterior of the tubular casing 59 and a tapered interior portion of the insert 48 provides a fluid tight association of the parts.

Secured to the valve stem 60 closely adjacent one end thereof, as is clearly shown in Figure 3, is a substantially cup-shaped valve member 66. A helical spring 67 positioned internally of the casing 59 and externally of the valve stem 60 biases the valve member 66 to closed position.

Secured to the valve housing 34 by any suitable means is a perforated cover member 68. A sealing diaphragm 69 is interposed between the cover 68 and the valve housing 34, as is best shown in Figure 3, to provide a fluid-tight joint. Operably positioned in the perforations of the cover member 68 and in alignment with the valve members 57 and 58 are identical tappet members 70, 70. A rocker arm 72 pivoted as at 73 to the cover 68 carries adjustment screws 74 which are engageable with the tappet members 70. It is to be observed that movement of the rocker arm 72 in a clockwise direction closes the inlet valve 58 and opens the outlet valve 57. Movement of the rocker arm 72 in a counterclockwise direction closes the valve 57 and opens the valve 58 to the position in which the parts are shown in Figure 3. A portion of the rocker arm 72 is turned at right angles to form an ear 75 which is slotted as at 76 to receive an operating arm 77.

Secured to the base of the pilot valve assembly 33 closely adjacent the valve housing 34 is an electromagnetic element 80. Electric energy is conducted to the electromagnetic element 80 through lead wires 81 and 82 which in turn may be encased in a suitable conduit 83. An end of the lead wire 82 is secured to a fixed contact 84 which in turn is positioned closely adjacent the free end of a thermostat blade as is clearly shown in Figure 1.

An armature 86 pivoted as at 85 to be operably associated with the electromagnetic element 80 carries the operating arm 77 which is rigidly attached thereto. The armature 86 is biased to deenergized position by a spring member 87. It will be apparent that clockwise movement of the operating arm 77 results in anticlockwise movement of the rocker arm 72 and anticlockwise movement of the operating arm 77 and armature 86 results in clockwise movement of the rocker arm 72.

The electromagnetic member 80 is adapted to be operably associated with a room thermostat 88 or other activating element. In the illustration shown in Figure 1 a line circuit indicated by the reference numeral 90 supplies a transformer 91, which through its secondary winding 92 transmits electrical energy for operating the electromagnetic element 80. The transformer 91 is connected with the thermostat 88 by means of a lead wire 93.

Secured to the pilot valve assembly 33 as by a bracket 94 and screws 95 is a cover 96, one end of which is preferably bifurcated to straddle the conduit 83. Rotatably secured to the cover 96 is a shaft 97 to which is fixed a cam 98. The shaft 97 and the cam 98 form a part of a manual reset which is operated through a handle 99. The cam 98 is positioned in alignment with an offset portion of the armature 86, as is best shown in Figure 2. A torque spring 100 positioned on the shaft 97 and having one end thereof secured to the cover 96 and the other end secured to the cam 98 provides a means for biasing the cam to the position shown in Figure 2. The manual operator provides a means for operating the device in the event of power failure. For instance, assuming that the electro-magnetic device is inoperable by reason of power failure or the like and it is desirable to operate the pilot valve assembly, the handle 99 of the manual operator is rotated in a clockwise direction bringing the cam into engagement with the offset portion of the armature 86. This engagement of the cam 98 rotates the armature and attached operating arm in a counterclockwise direction which movement results in the clockwise movement of the rocker arm 72. The cam 98 is rotated to a position slightly beyond center. The energy of the spring 87 biases the member 86 against the cam 98 sufficiently to render the spring 100 ineffective to return the cam, so it remains as thus positioned. Upon energization of the electromagnetic member 80, the armature 86 moves further in a counterclockwise direction thus releasing the cam which is immediately rotated back to its original position by the flexing of the torque spring 100.

Extending from a point in the inlet of the valve body 10 to a pilot light 101 is a conduit 102. The pilot light 101 is positioned closely adjacent main burner 103. A supply pipe 104 connected to the outlet 12 of the valve body 10 provides a means for conveying fuel to the burner 103. Waste fluid from the pilot valve assembly 33 is conveyed from the passage 41 to a point closely adjacent the burner 103 by means of a conduit 105. The discharge terminals are thus grouped to facilitate ignition of waste and supply fuel by the constantly burning pilot light.

*Operation*

The improved device of this invention is illustrated in the drawings in closed or satisfied position. The thermostat 88 is open, the main valve 14 is closed, the inlet valve of the pilot valve assembly is open and the outlet valve 57 thereof is closed. Assume now that the temperature to which the thermostat is responsive drops sufficiently to cause the free end of the thermostat member 88 to move into engagement with the contact 84 at the end of the wire 82. Then an electric circuit is established as follows: from the transformer 91 through the wire 93, thermostat 88, wire 82, electromagnetic member 80 and return through wire 81 to the transformer 91. The electromagnetic member 80 is immediately energized and moves the armature 86 in a counterclockwise direction. This results in clockwise rotation of the rocker arm 72 which movement depresses the tappet 70 for the outlet valve 57 and releases the tappet 70 for the inlet valve 58, thus opening the outlet valve 57 and permitting the inlet valve 58 to close. Fluid is immediately released from the chamber 24 through the passage 43a, passage 43, opening 37, passage 55, counterbore 49, passage 54, recess 44, open valve 57, counterbore 48, passage 56, opening 35, passage 41 and thence through the waste conduit 105 to the burner 103 where it is consumed. At this stage it is to be observed that communication between the chambers 24 and 25 is interrupted by the closing of the valve 58. Consequently the trapped pressure in the chamber 25, which is in communication with the inlet 14, raises the diaphragm 23 and moves the associated valve 14 toward open position. This movement is relatively rapid until the lower end of the passage 30 is covered by the sleeve 31. All flow of fluid through this passage then ceases and further opening movement of the valve is in ratio to the rate of flow through the auxiliary passageway 32. It is to be noted that the initial opening movement of the valve is relatively rapid and thereafter further opening of the valve 14 is at a much slower rate. The rapid initial opening of the supply valve 14 coupled with the slow gradual further opening thereof eliminates dangerous and undesirable results in the combustion chamber.

Upon the thermostat 88 becoming satisfied as the result of a rise in the temperature of the element to which it is responsive, the engagement between the free end of this member and the contacting element 84 of the wire 82 is broken. This action results in the deenergization of the electromagnetic member 80. Upon deenergization of the electromagnetic member 80 the spring 87 rotates the armature 86 in a clockwise direction resulting in the anticlockwise movement of the rocker arm 72. This movement of the rocker arm closes the waste valve 57 and opens the inlet valve 58 permitting fluid to pass from the lower chamber 25 through the passage 42, opening 36, passage 53, valve 58, counterbore 49, passage 55, opening 37, passage 43, passage 43A and into the upper chamber 24. As the pressure in the chambers 24 and 25 tends toward equalization, the supply valve 14, the stem 26, and the diaphragm 23, because of the counterweight 27 positioned thereon, all move in a valve closing direction. The closing movement is accelerated when the lower end of the passage 30 clears the lower end of the sleeve 31 permitting additional fluid to pass therethrough. When the main valve 14 is seated the remainder of the elements of the improved device assume the position shown in the drawings.

It is to be noted that the seat of the valve member 66 is located at the bottom of a recess formed therein and also that the opposite side thereof is stepped to break the effective area of the exposed surface. This construction produces a valve substantially cup-shaped in section and one wherein fluid passing through the valve is first directed upwardly, as positioned in the drawing, and then abruptly turned in a downward direction. This abrupt change in the direction of flow by the valve member tends to utilize the flow in assisting to maintain the valve in open position. Consequently excessive wear on the sealing diaphragm by the opposite end of the valve stem and the tappet is substantially eliminated as compared to wear caused by a valve stem having a conventional disc valve.

It is also to be noted that the cup-shaped valve 66 on both valve members 57 and 58 seat in the direction of flow of fluid passing therethrough. Thus a relatively light spring 67 is sufficient to maintain the valve 66 in tightly sealed engagement with its seat 64. This results in a considerable saving in spring material as compared to valves which are adapted to seat against the direction of flow.

It will be apparent from the foregoing that herein is provided an efficient, compact and exceptionally economical control device. Moreover the improved device of this invention is exceptionally desirable from a standpoint of accessibility for repairs, replacement, and adjustment. The valve members 57 and 58 may be readily removed for inspection, repairs, or replacement simply by removing the cover 68 and unscrewing the valves from the insert or the insert may be removed with the valve.

It is to be noted that the removal of the cover and its replacement will not affect the adjusted engagement between the adjustment screws and the tappets. Consequently readjustment of the members 74, 74 is not required when the cover 68 is replaced.

It will also be apparent to those skilled in the art to which the improved device of this invention appertains that numerous changes in design and construction may be made without departing from the spirit or scope of the invention. Accordingly the patent granted hereon is not to be limited to the precise embodiment here shown or in any other manner except as is necessitated by the terminology of the appended claims when given the range of equivalents to which they may be entitled.

I claim as my invention:

1. In a pilot valve, a body having a pair of open end valve receiving recesses in spaced parallel relation formed therein, each recess comprising a pair of concentric bores with the bore of smaller diameter extending into said body a greater distance than the bore of larger diameter, an insert removably positioned in the intermediate portion of each recess, a valve unit removably positioned in each insert and biased in the direction of flow and toward closed position, each of said valve units having an operating stem extending toward the open end of the recess in which it is positioned, an inlet and an outlet passage extending into each of said recesses and being disposed to direct flow to urge each valve toward closed position, a straight diagonally disposed passage connecting the inlet of one valve with the outlet of the other valve, a cover having a pair of tappet receiving apertures adapted to register with said recesses formed therein, a tappet slidably positioned in each of said apertures, said cover being detachably secured to said recessed body and being removable to provide access for replacement of said valve units, an operating member rockably secured to said cover, means for overcoming said flow urge and said biasing means to normally maintain one of said valves in open position, a pair of adjustment members extending through said operating member and having one end thereof in adjusted engagement with the end of an associated tappet, abutment means for limiting closing movement of said tappets and permitting further movement of said operating member, and means interposed between said cover and said body for sealing the open end of said recesses.

2. In a pilot valve for controlling flow, a body having a pair of valve receiving recesses therein, each of said recesses comprising a pair of concentric counter-bores with the bore of smaller diameter extending into the body a greater distance than the bore of larger diameter and being screw threaded, said bore of larger diameter having an open end, an insert having a screw threaded bore threaded into each of said smaller bores, a valve unit threaded into each of said inserts, said valve unit being biased toward closed position, passage means disposed to direct flow to each of said valves and thereby assist in maintaining said valves in closed position, said passage means including a straight passage extending diagonally between one of the bores of larger diameter to a bore of smaller diameter, each valve unit having an operating stem extending toward the open end of the recess in which it is positioned, means for overpowering the biasing and flow pressure on one of said valves to normally maintain it in open position, flexible means sealing the recesses and having its inner surface engageable with each operating stem, a cover positioned on said flexible means and detachably secured to said body, said cover and said flexible means being removable to provide access for removal or repair of both of said valves, an operating arm rockably mounted on said cover and having each end thereof operably associated through linkage means to the outer surface of said flexible means for moving said linkage means to reciprocatingly operate said valves, and adjustment means carried by said operating arm to adjust its position relative to said linkage means.

3. In a fluid control device, a valve housing, first and second valve receiving recesses formed in said housing, said recesses each comprising concentric bores of different diameters, an insert in fluid tight association with each recess, a cylindrical valve unit in fluid tight association with each insert, each of said valve units comprising a cylindrical casing having a valve stem extending longitudinally therethrough, a valve attached to said stem, means positioned within said cylindrical casing biasing said valve toward sealing engagement with the end of said cylindrical casing, means for overcoming said bias to normally maintain one of said valves in open position, an inlet passage extending into said first recess, an outlet passage extending from said second recess, a straight passageway extending diagonally of said valve housing and joining the outlet portion of said first recess with the inlet portion of said second recess, said inlet passage and said common passageway being disposed to deliver fluid against said valve in closing direction to assist in their closing and sealing function, a closure member detachably secured to said valve housing and closing said recesses, said closure member being removable to provide access for replacing said valves, tappet members slidably positioned in said closure member and in alignment with said valve stems, and means for concurrently operating said valves in opposite directions.

4. In a pilot valve, a body having a pair of recesses, a removable valve unit secured in each of said recesses, each of said units comprising a valve stem extending through and beyond each end thereof with a valve head on the recess end and means urging said head to a normally seated position against said unit, a first fluid supply passage extending from the bottom portion of one of said recesses to the exterior of said body, a second passage extending from the open end of the same recess to the exterior of said body, a third passage extending from the same open end to the bottom portion of the other recess, a fourth passage extending from the open end of said other recess to the exterior of said body, a cover removably secured to said body and covering each of said recesses and the valve therein, each of said recesses and passages being straight with its axis intersecting one of the top and bottom surfaces of said body, and means on said cover adapted to selectively actuate one or the other of said valves to an open position.

5. In a pilot valve, a body having a pair of recesses therein, a removable valve unit secured in each of said recesses, a first fluid supply passage extending from the bottom portion of one of said recesses to the exterior of said body, a second passage extending from the open end of the same recess to the exterior of said body, a third passage extending from the same open end to the bottom portion of the other recess, a fourth passage extending from the open end of said other recess to the exterior of said body, a cover removably secured to said body and covering each of said recesses and the valve therein, each of said recesses and passages being straight with its axis intersecting one of the top and bottom surfaces of said body, and means on said cover adapted to selectively actuate one or the other of said valves to an open position.

6. In a pilot valve, a body having a pair of recesses therein, a removable valve unit secured in each of said recesses providing a supply and a bleed valve respectively, a first supply passage extending from the bottom portion of one of said recesses to the exterior of said body, a second passage extending from the exterior of said body to a point therein in open communication with the discharge end of the supply valve and the inlet end of the bleed valve, a third passage extending from the same open end to the bottom portion of the other recess, a fourth passage extending from the open end of said other recess to the exterior of said body, a cover removably secured to said body covering each of said recesses and a valve therein, each of said recesses and passages being straight with its axis intersecting one of the top and bottom surfaces of said body, and means on said cover adapted to selectively actuate one or the other of said valves to an open position.

GEORGE H. BERKHOLDER.

REFERENCES CITED

The following references are of record in the file of this patent:

UNITED STATES PATENTS

| Number | Name | Date |
|---|---|---|
| 675,112 | Rutherford | May 28, 1901 |
| 721,562 | Hibbard | Feb. 24, 1903 |
| 1,460,804 | Shaw | July 3, 1923 |
| 1,651,034 | McIntosh | Nov. 29, 1927 |
| 1,764,005 | Cochin | June 17, 1930 |
| 1,928,461 | Pelouch | Sept. 26, 1933 |
| 1,952,147 | Stahl | Mar. 27, 1934 |
| 2,197,144 | Carnes | Apr. 16, 1940 |
| 2,280,345 | Nickelis | Apr. 21, 1942 |
| 2,293,132 | Gora | Aug. 18, 1942 |
| 2,333,913 | Beam | Nov. 9, 1943 |

FOREIGN PATENTS

| Number | Country | Date |
|---|---|---|
| 466,761 | Great Britain | of 1937 |
| 476,848 | Great Britain | of 1937 |
| 493,652 | Great Britain | Oct. 12, 1938 |